United States Patent
Tee et al.

(10) Patent No.: US 8,048,516 B2
(45) Date of Patent: Nov. 1, 2011

(54) AIR PERMEABLE WATERPROOF BICOMPONENT FILM

(75) Inventors: Yit-Hong Tee, Lee's Summit, MO (US); Taher Abujoudeh, Lee's Summit, MO (US); Cynthia Polizzi, Lee's Summit, MO (US)

(73) Assignee: BHA Group, Inc., Kansas City, MO (US)

( * ) Notice: Subject to any disclaimer, the term of this patent is extended or adjusted under 35 U.S.C. 154(b) by 247 days.

(21) Appl. No.: 12/275,802

(22) Filed: Nov. 21, 2008

(65) Prior Publication Data

US 2010/0129629 A1 May 27, 2010

(51) Int. Cl.
*B32B 3/26* (2006.01)
*B32B 37/04* (2006.01)

(52) U.S. Cl. ............ 428/316.6; 428/319.3; 428/319.7; 428/308.4; 428/306.6; 156/60

(58) Field of Classification Search ............ 428/3, 319.3, 428/319.7, 308.4, 306.61, 306.6, 316.6; 156/60
See application file for complete search history.

(56) References Cited

U.S. PATENT DOCUMENTS

| | | | |
|---|---|---|---|
| 4,194,041 A * | 3/1980 | Gore et al. | 442/289 |
| 4,443,511 A | 4/1984 | Worden et al. | |
| 4,532,316 A | 7/1985 | Henn et al. | |
| 4,961,985 A | 10/1990 | Henn et al. | |
| 6,511,927 B1 * | 1/2003 | Ellis et al. | 442/77 |
| 2010/0255741 A1 * | 10/2010 | Tee et al. | 442/77 |
| 2010/0316819 A1 * | 12/2010 | Bansal et al. | 428/35.7 |

FOREIGN PATENT DOCUMENTS

WO 2004029772 A1 4/2004

OTHER PUBLICATIONS

European Search Report dated Apr. 1, 2010.

* cited by examiner

*Primary Examiner* — Hai Vo
(74) *Attorney, Agent, or Firm* — Pearne & Gordon LLP

(57) ABSTRACT

A waterproof, vapor-permeable and gas-permeable sheet material and a method of making are provided. The sheet material includes a waterproof microporous layer and a thermoplastic layer attached to the microporous layer. The thermoplastic layer is vapor-permeable and air-permeable. The microporous layer is at least partially integrated with the thermoplastic layer to form a zone that prevents passage of water droplets, while permitting passage of water vapor and air, when a chemical is present on the sheet material that would otherwise cause the microporous layer to permit passage of water droplets. The Zone can be considered to be resistant to chemical interference with at least the waterproof property of the microporous layer and inhibits detachment of the layers.

20 Claims, 2 Drawing Sheets

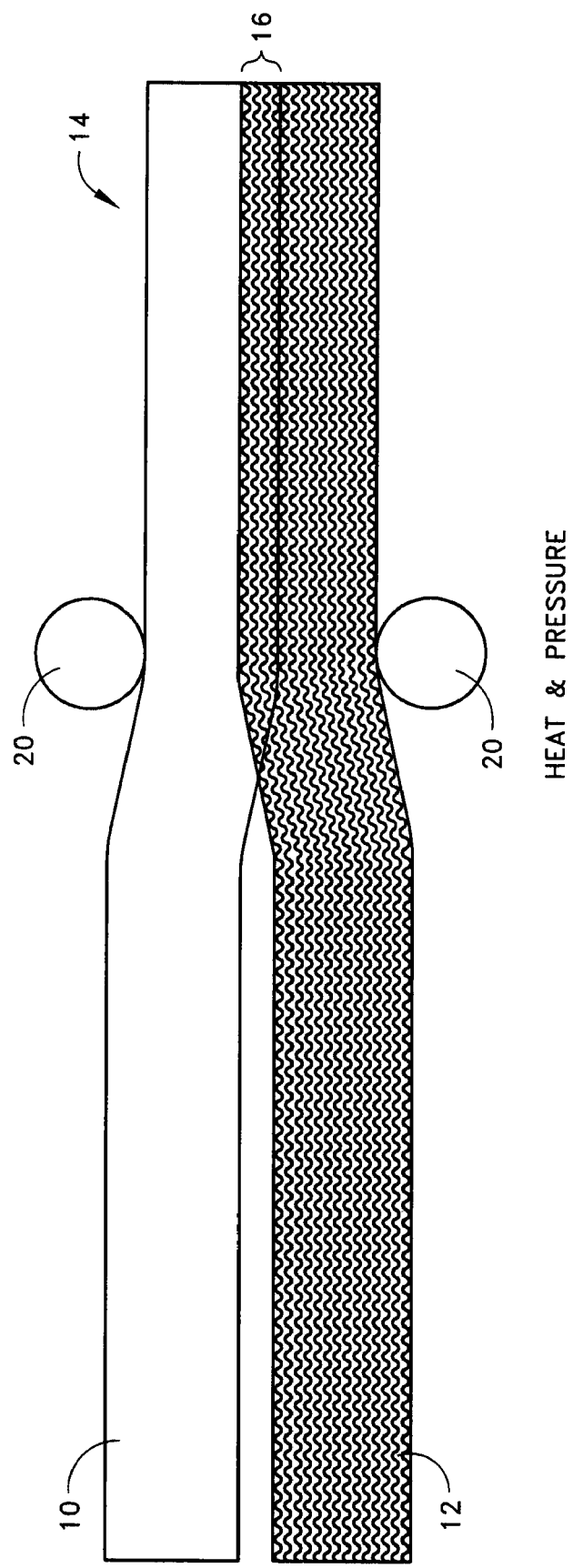

US 8,048,516 B2

AIR PERMEABLE WATERPROOF BICOMPONENT FILM

FIELD OF THE INVENTION

The present invention relates generally to sheet materials or films, and more particularly, to sheet materials or films that have qualities such as being water penetration resistant, water vapor permeable, air permeable and resistant to significant property degradation resulting from chemical presence.

BACKGROUND OF THE INVENTION

Fluoropolymers and thermoplastic elastomers are known and are used in many different applications, including outdoor sheet materials or films. A fluoropolymer layer or a thermoplastic elastomer layer may be utilized to provide some desired properties, such as breathability or resistance to water penetration. Thus, it is known to provide a breathable and water resistant sheet material. Such a sheet material is very useful in an outdoor environment. For example, such sheet material can be used to make articles of clothing, outdoor gear, protective articles and the like. However, the presence of some chemicals, such as from insect repellant, may cause degradation of at least some of the properties of the sheet material such as the level of water penetration resistance. Specifically, propensity that the sheet material will permit penetration/passage of water will be increased due to the chemical presence on the sheet material. Such increased propensity to permit penetration/passage of water may be referred to as wetting out.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a waterproof, vapor-permeable and gas-permeable sheet material. The sheet material includes a waterproof microporous layer and a thermoplastic layer attached to the microporous layer. The thermoplastic layer is vapor-permeable and air-permeable. The microporous layer is at least partially integrated with the thermoplastic layer to form a zone that prevents passage of water droplets, while permitting passage of water vapor and air, when a chemical is present on the sheet material that would otherwise cause the microporous layer to permit passage of water droplets.

In accordance with another aspect, the present invention provides a method of constructing a waterproof, vapor-permeable and gas-permeable sheet material. The method includes providing a first layer that is waterproof microporous. The method includes providing a second layer that is thermoplastic. The method includes at least partially integrating the first and second layers together to form a zone that prevents passage of water droplets, while permitting passage of water vapor and air, when a chemical is present on the sheet material that would otherwise cause the microporous layer to permit passage of water droplets.

In accordance with yet another aspect, the present invention provides a waterproof, vapor-permeable and gas-permeable sheet material. The sheet material includes a waterproof microporous layer and a thermoplastic layer attached to the microporous layer. The thermoplastic layer is vapor-permeable and air-permeable. The microporous layer is at least partially integrated with the thermoplastic layer to form a zone that is resistant to chemical interference with at least the waterproof property of the microporous layer.

In accordance with still another aspect, the present invention provides a waterproof, vapor-permeable and gas-permeable sheet material. The sheet material includes a waterproof microporous layer and a thermoplastic layer attached to the microporous layer. The thermoplastic layer is vapor-permeable and air-permeable. The microporous layer is at least partially integrated with the thermoplastic layer to form a zone that inhibits detachment of the microporous layer and the thermoplastic layer and that prevents passage of water droplets, while permitting passage of water vapor and air, when a chemical is present on the sheet material that would otherwise cause the microporous layer to permit passage of water droplets.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 3 illustrates a schematic diagram showing an example thermal lamination process involved in the manufacture of the bicomponent sheet material.

DESCRIPTION OF EXAMPLE EMBODIMENTS

Figure 1:
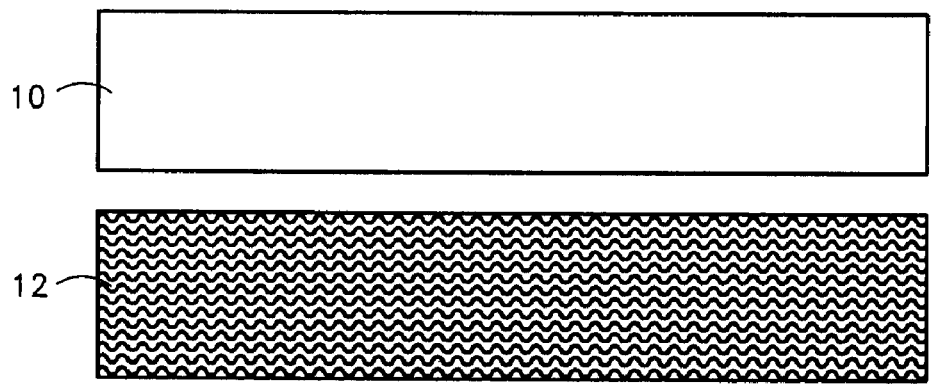
FIG. 1 illustrates an edge view of an example air-permeable waterproof bicomponent sheet material during a process step according to one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to FIG. 1, an example in accordance with one aspect of the present invention is shown. Specifically, the example shows constituent material layers 10 and 12 that are used to provide a resultant bicomponent sheet material 14 (FIG. 2) that is air-permeable, vapor-permeable, waterproof, and resistance to change that would be caused by a chemical. It is to be appreciated that waterproof is intended to mean the commonly understood resistance to penetration of non-vapor water. Utilizing the shown constituent material layers 10 and 12, the bicomponent sheet material 14 includes two layers, with the first layer 10 being a microporous fluoropolymer-based layer having air-permeable, vapor-permeable and waterproof characteristics and the second layer 12 being a thermoplastic elastomer layer having air-permeable and vapor-permeable characteristics. Thus, the first layer 10 is an example of a waterproof microporous layer and the second layer 12 is an example of a thermoplastic layer.

It is to be appreciated that the sheet material 14 may also be easily termed a film or a fabric. For understanding these terms of sheet material, film and fabric should be considered synonymous. Also, within the Figures sinusoidal shading of the second layer 12 is only to permit identification/distinction from the first layer and is not intended to indicate sectioning. It is to be appreciated that the dimensions (i.e., length, width and thickness) of the sheet material may be varied, and the representations schematically shown in the Figures are not to be used for dimension limitations.

Figure 2:
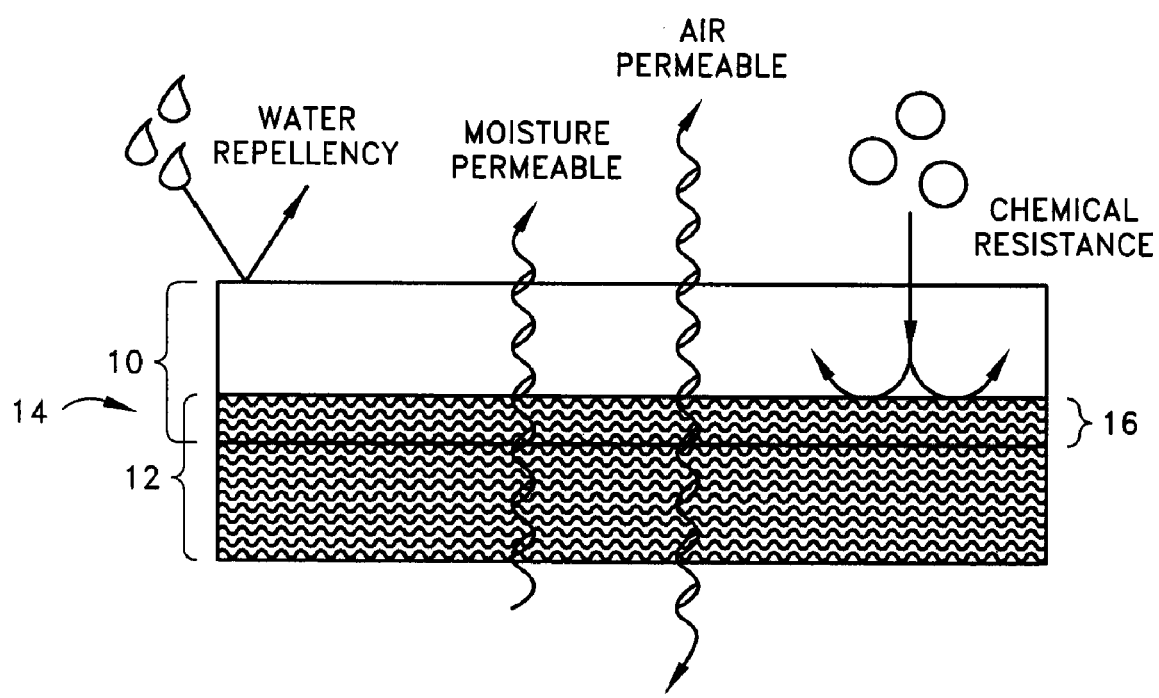
FIG. 2 illustrates an edge view of the example air-permeable waterproof bicomponent sheet material after thermal lamination with markings designating portions that provide breathability, waterproofness, and resistance to change that would be caused by a chemical in accordance with one aspect of the present invention.

In accordance with one aspect of the present invention, with these two layers 10 and 12 bonded together, waterproofness, water vapor permeability, air permeability are provided. Moreover, waterproofness, water vapor permeability, air permeability are provided even if a chemical that would otherwise degrade resistance to water penetration of the fluoropolymer first layer 10. A loss of waterproofness is associated with wetting and penetration. Turning to FIG. 2, an example of the bonded layers 10 and 12 to provide an example of the resultant sheet material 14 is shown.

Still with reference to FIG. 2, for the fluoropolymer-based layer 10 of the presented example, the layer is hydrophobic and is also air and water vapor-permeable. These features are schematically shown in FIG. 2. In one example, the fluoropolymer is expanded microporous polytetrafluoroethylene, also known as ePTFE. The fluoropolymer has a plurality of microporous openings providing pores small enough to prevent the passage of water droplets yet large enough to allow the passage of air and vapor. Pore size directly affects the permeability and strength of the fluoropolymer-based layer. As pore size is increased, the fluoropolymer-based layer becomes more breathable, allowing an easier passage of water vapor and air. A larger pore size, however, results in weaker fluoropolymer strength and may lead to easier tearing and decomposition of the fluoropolymer-based layer. Similarly, a smaller pore size results in reduced vapor and air permeability but a stronger layer. Consequently, an optimal pore size may provide the balance of a strong and breathable fluoropolymer-based layer.

Moisture vapor transmission rate, also known as MVTR, is a measure of the passage of water vapor through a membrane expressed in grams/meter$^2$/day. Air permeability, expressed in cubic feet per minute, measures the time it takes for air to pass through the sample. A high MVTR and air permeability results in good comfort levels since sweat and body heat pass through the membrane and are quickly removed from the body.

The fluoropolymer-based layer 10 in the presented example may include a number of different ePTFE qualities ranging in weight from 0.5 ounces/yard$^2$ to 0.65 ounces/yard$^2$ and thickness from 0.0017" to 0.003". Consequently, use of such a constituent material helps to provide a lightweight and thin bicomponent sheet material 14 and helps to contribute to good comfort levels. The following table 1 lists a number of fluoropolymer layers or membranes, which may be utilized along with their associated properties.

TABLE 1

| ePTFE Sample | MVTR (g/m$^2$/day) Modified JIS L1099-B2 | Air Perm (cfm) ASTM D737 | Mullen Burst Strength (psi) ASTM D751 Mullen after 16-hour DEET exposure |
|---|---|---|---|
| 1 | 61,104 | 0.33 | 30.00 |
| 2 | 69,412 | 0.55 | 23.00 |
| 3 | 66,951 | 0.32 | 24.00 |
| 4 | 75,623 | 0.30 | 37.50 |
| 5 | 55,068 | 0.15 | 49.20 |

Turing back to the schematic representation shown in FIG. 2, the example thermoplastic elastomer layer 12 is hydrophilic and both air and water vapor-permeable. These features are schematically shown in FIG. 2. The thermoplastic elastomer layer 12 is porous allowing the pores fill with water when exposed to liquid water. Similar to the fluoropolymer-based layer 10, the pore size of the thermoplastic elastomer layer 12 directly affects both the strength and water and air permeability. A larger pore size leads to more permeability but a weaker material. In one embodiment, the thermoplastic elastomer layer 12 may be a polyether-based copolymer, such as polyether-block-polyester, polyether-block-polyamide, polyurethane, etc.

As stated, the sheet material 14 is bi-component and contains the two layers 10 and 12. This is shown schematically within FIG. 2. However, it should also be appreciated that the shown example of FIG. 2 presents the concept of the two layers 10 and 12 overlapping. This overlapping is to indicate an intermingling, intermigration, or the like of the two constituent layers to provide bonding. This intermingling, intermigration, or the like provides a zone 16 that may help to provide some enhanced properties. One example is that of the property of retaining an overall resistance to water drop penetration (i.e., waterproofness) of the sheet material 14 despite presence of a chemical on the sheet material that would otherwise cause the first layer 10 to lose its resistance to water drop penetration. Such retention of overall resistance to water drop penetration (i.e., waterproofness) is provided by the zone 16 of intermingling, intermigration, or the like within the sheet material 14.

It is to be appreciated that the zone 16 also prevents delamination of the first and second layers 10 and 12. This prevention of delamination is thus durability of the sheet material 14. Within one example, a sample of the sheet material 14 was washed for 200 hours in plain water at 30° C. with no delamination.

FIG. 3 schematically shows one example method of making the bi-component sheet material 14. In the shown example, elements 20 (e.g., heated rollers) apply heat and pressure to the two constituent material layers 10 and 12. The material layers 10 and 12 would be moved from left to right during such processing. Specifically, the elements 20 provide the heat and pressure to each segment as the segment is moved past the elements. It is to be appreciated that other methodology may be utilized.

The following table 2 includes a number of bicomponent material samples including various fluoropolymer material layers bonded with various non-fluoropolymer material layers. The sample ID includes a fluoropolymer from the above table 1, bonded with a microporous thermoplastic. The different properties of each combination are listed.

TABLE 2

| BiComponent Sample | Description | MVTR (g/m²/day) Modified JIS L1099-B2 | Air Perm (cfm) ASTM D737 | Gurley Test (sec) ASTM D726 | Mullen Burst Strength (psi) ASTM D751 Mullen after 16-hour DEET exposure |
|---|---|---|---|---|---|
| 1 | Benchmark BiComponent Thin Film | 14,219 | 0 | NA | 170.00 |
| 2 | Thermally Laminated Thin Film. ePTFE + microporous PU | 50,000 | NA | 214.34 | 92.24 |
| 3 | Thermally Laminated Thin Film. ePTFE + microporous PU | 58,000 | NA | 251.74 | 78.06 |
| 4 | Thermally Laminated Thin Film. ePTFE + porous polyether-polyamide copolymer | 17,000 | 0.16 | 38.93 | 70.00 |
| 5 | Thermally Laminated Thin Film. ePTFE + microporous PU | 45,000 | NA | 463.93 | 90.00 |
| 6 | Thermally Laminated Thin Film. ePTFE + microporous PU | 33,000 | NA | 463.93 | 120.00 |
| 7 | Thermally Laminated Thin Film. ePTFE + porous polyether-polyamide copolymer | 15,000 | NA | 470.00 | 136.41 |
| 8 | Thermally Laminated Thin Film. ePTFE + porous polyether-polyamide copolymer | 16,000 | 0.1 | 60.87 | 89.00 |
| 9 | Thermally Laminated Thin Film. ePTFE + porous polyether-polyesther copolymer | 18,322 | 0.07 | 83.40 | 76.00 |
| 10 | Thermally Laminated Thin Film. ePTFE + microporous PU | 40,000 | 0.15 | 43.51 | 77.38 |
| 11 | Thermally Laminated Thin Film. ePTFE + microporous PU | 43,000 | 0.18 | 36.79 | 59.00 |

Turning again to FIG. 3, in one the specific example the fluoropolymer-based layer 10 and the thermoplastic elastomer layer 12 may be attached to each other by thermal lamination. During thermal lamination, a high temperature and pressure is applied to the bicomponent sheet material 14 to form a bond between the two layers. The increased temperature and pressure causes a surface of each layer to partially liquefy and lock into the corresponding surface as the thermoplastic elastomer flows into the pores of the fluoropolymer. Bond strength, and thus the strength of the adhesion between the two layers, increases proportionally with the surface area of each layer. Therefore, a rough surface has a higher surface area and the ability to form a stronger bond. Thermal lamination of the bicomponent sheet material 14 may cause a slight decrease in water vapor permeability (MVTR) and air permeability, as evidenced by comparing the MVTR and air permeability results of the first and second tables. It is important to have an optimal balance between temperature and pressure when thermally laminating the layers. A temperature and pressure that is too high may cause excessive liquidation of the thermoplastic elastomer surface, leading to clogging of the fluoropolymer pores and a significant decrease in vapor and air permeability. A temperature and pressure that is too low will lead to a weaker bond between the two layers. Thus, a balance between temperature and pressure is beneficial.

Thermal lamination causes the fluoropolymer and thermoplastic elastomer layers to bond, forming a chemically resistant zone 16. The chemically resistant zone 16 is the area including the bond between the two layers. The zone 16 is designed to reduce the passage of common chemical contaminants that may be harmful to the user and may damage the bicomponent sheet material 14. The presence of chemicals may cause degradation of the bicomponent sheet material 14 by reducing the strength and impairing the vapor and air permeability characteristics. One example chemical that could cause the degradation of the water resistance of the material of the first layer 10 is N,N-Diethyl-meta-toluamide, also known as DEET. Other examples of chemicals that could cause degradation include chemicals present in fuels and solvents. Still further, other chemical contaminants, such as acid, are also contemplated. Such chemicals are sometimes referred to as challenge agent because of their propensity to degrade desirable material properties. Of course the particular chemical is not a limitation on the present invention. Such chemicals, if present on the sheet material 12 would otherwise cause the microporous material of the first layer 10 to permit passage of water droplets, but the present invention prevents such unwanted occurrence (i.e., loss of waterproofness) and thus provides a resistance to such chemicals.

DEET is a common active ingredient in insect repellents. Since the bicomponent sheet material 14 may be used in outdoor applications, such as in gloves, boots, tents, etc., it is it is beneficial for the sheet material 14 to be resistant to degradation of the waterproof property from a chemical, such as DEET, used in insect repellant. This resistance to degradation allows the sheet material 14 to retain its waterproof, vapor permeable, and air permeable characteristics despite the presence of the chemical. The bicomponent sheet material 14 can retain values even after many hours (e.g., 16 as shown in table 2) of DEET exposure. In comparison, the fluoropolymer-based layer, alone, has a lower value after a 16 hour DEET exposure, as shown in the first table.

The final bicomponent sheet material 14 may have a thickness of less than 100 micron, or 0.1 millimeters. This low thickness, along with a light weight, adds to the comfort level of the bicomponent sheet material 14. The sheet material 14 may also be combined with another fabric layer on both sides for use in the construction of outerwear, such as gloves, boots, tents, etc.

Example uses of the bicomponent material include, but are not limited to, gloves, hats, coats, jackets, shirts, pants, under garments, shoes, boots, protective wear, various other articles of clothing, backpacks, sleeping bags, tents, various other outdoor gear, and the like. With regard to uses that involve something worn by a person, it is must be appreciated that as the person sweats both water vapor and liquid perspiration are generated on the skin. A high MVTR and air permeability may provide for this water vapor and liquid sweat to quickly pass through the bicomponent material. As such, the bicomponent sheet material is quite useful for the use examples mentioned above concerning items that are worn by a person. Of course, the present invention is not limited to such uses and other uses are contemplated.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A waterproof, vapor-permeable, gas-permeable and chemical resistant sheet material including:
    a waterproof, vapor-permeable and air-permeable microporous sheet layer;
    a porous, polymerized thermoplastic sheet layer attached to the microporous sheet layer, the thermoplastic sheet layer being vapor-permeable and air-permeable; and
    the microporous sheet layer being at least partially integrated with the thermoplastic sheet layer, with a portion of the polymerized thermoplastic sheet layer within pores of the microporous sheet layer, to form a zone that prevents passage of water droplets, while permitting passage of water vapor and air, when a chemical is present on the sheet material that would otherwise cause the microporous sheet layer to permit passage of water droplets.

2. The sheet material of claim 1, wherein the microporous sheet layer is expanded polytetrafluoroethylene.

3. The sheet material of claim 1, wherein the thermoplastic sheet layer is polyurethane.

4. The sheet material of claim 1, wherein the thickness is less than 0.1 mm.

5. The sheet material of claim 1, wherein the microporous sheet layer is at least partially integrated with the thermoplastic sheet layer by thermal lamination.

6. The sheet material of claim 1, wherein the zone inhibits detachment of the microporous sheet layer and the thermoplastic sheet layer.

7. A waterproof, vapor-permeable, gas-permeable and chemical resistant sheet material including:
    a waterproof, vapor-permeable and air-permeable microporous sheet layer;
    a porous, polymerized thermoplastic sheet layer attached to the microporous sheet layer, the thermoplastic sheet layer being vapor-permeable and air-permeable; and
    the microporous sheet layer being at least partially integrated with the thermoplastic sheet layer, with a portion of the polymerized thermoplastic sheet layer within pores of the microporous sheet layer, to form a zone that is resistant to chemical interference with at least the waterproof property of the microporous sheet layer.

8. The sheet material of claim 7, wherein the microporous sheet layer is expanded polytetrafluoroethylene.

9. The sheet material of claim 7, wherein the thermoplastic sheet layer is polyurethane.

10. The sheet material of claim 7, wherein the thickness is less than 0.1 mm.

11. The sheet material of claim 7, wherein the microporous sheet layer is at least partially integrated with the thermoplastic sheet layer by thermal lamination.

12. The sheet material of claim 7, wherein the zone inhibits detachment of the microporous sheet layer and the thermoplastic sheet layer.

13. A waterproof, vapor-permeable, gas-permeable and chemical resistant sheet material including:
    a waterproof, vapor-permeable and air-permeable microporous sheet layer;
    a porous, polymerized thermoplastic sheet layer attached to the microporous sheet layer, the thermoplastic sheet layer being vapor-permeable and air-permeable; and
    the microporous sheet layer being at least partially integrated with the thermoplastic sheet layer, with a portion of the polymerized thermoplastic sheet layer within pores of the microporous sheet layer, to form a zone that inhibits detachment of the microporous sheet layer and the thermoplastic sheet layer and that prevents passage of water droplets, while permitting passage of water vapor and air, when a chemical is present on the sheet material that would otherwise cause the microporous sheet layer to permit passage of water droplets.

14. The sheet material of claim 13, wherein the microporous sheet layer is expanded polytetrafluoroethylene.

15. The sheet material of claim 13, wherein the thermoplastic sheet layer is polyurethane.

16. A method of constructing a waterproof, vapor-permeable, gas-permeable and chemical resistant sheet material including the steps of:
   providing a first sheet layer that is waterproof, vapor-permeable, air-permeable and microporous;
   providing a second sheet layer that is a porous, polymerized thermoplastic; and
   at least partially integrating the first and second sheet layers together, by pressing the first and second sheet layers to place a portion of the polymerized thermoplastic sheet layer within pores of the microporous sheet layer, to form a zone that prevents passage of water droplets, while permitting passage of water vapor and air, when a chemical is present on the sheet material that would otherwise cause the microporous sheet layer to permit passage of water droplets.

17. The method of claim 16, wherein the first sheet layer includes expanded polytetrafluoroethylene.

18. The method of claim 16, wherein the thermoplastic is a polyether-based copolymer.

19. The method of claim 16, wherein the thickness of the sheet material is less than 0.1 mm.

20. The method of claim 16, wherein the zone inhibits detachment of the microporous sheet layer and the thermoplastic sheet layer.

* * * * *

UNITED STATES PATENT AND TRADEMARK OFFICE
CERTIFICATE OF CORRECTION

| | |
|---|---|
| PATENT NO. | : 8,048,516 B2 |
| APPLICATION NO. | : 12/275802 |
| DATED | : November 1, 2011 |
| INVENTOR(S) | : Yit-Hong Tee et al. |

It is certified that error appears in the above-identified patent and that said Letters Patent is hereby corrected as shown below:

In column number 8, line 8, after the word "air-permeable;" please insert therefor --the thermoplastic sheet layer having an open celled structure;--.

In column number 8, line 36, after the word "air-permeable;" please insert therefor --the thermoplastic sheet layer having an open celled structure;--.

In column number 8, line 61, after the word "air-permeable;" please insert therefor --the thermoplastic sheet layer having an open celled structure;--.

In column 9, line 15, after the word "thermoplastic;" please insert therefor --the second sheet layer being vapor-permeable and air-permeable; the second sheet layer having an open celled structure;--.

Signed and Sealed this
Thirty-first Day of January, 2012

David J. Kappos
*Director of the United States Patent and Trademark Office*